US008576786B2

(12) United States Patent
Liao et al.

(10) Patent No.: US 8,576,786 B2
(45) Date of Patent: Nov. 5, 2013

(54) SYNCHRONIZATION CHANNEL FOR ADVANCED WIRELESS OFDM/OFDMA SYSTEMS

(75) Inventors: Pei-Kai Liao, Nantou County (TW); Yu-Hao Chang, Daya Township, Taichung County (TW); Kuo-Ming Wu, Zhubei (TW)

(73) Assignee: Mediatek (TW)

( * ) Notice: Subject to any disclaimer, the term of this patent is extended or adjusted under 35 U.S.C. 154(b) by 867 days.

(21) Appl. No.: 12/655,515

(22) Filed: Dec. 30, 2009

(65) Prior Publication Data

US 2010/0165942 A1 Jul. 1, 2010

Related U.S. Application Data

(60) Provisional application No. 61/141,843, filed on Dec. 31, 2008, provisional application No. 61/154,789, filed on Feb. 24, 2009.

(51) Int. Cl.
*H04W 4/00* (2009.01)

(52) U.S. Cl.
USPC ............ 370/329; 370/328; 370/340; 370/341

(58) Field of Classification Search
None
See application file for complete search history.

(56) References Cited

U.S. PATENT DOCUMENTS

2007/0076668 A1* 4/2007 Tirkkonen et al. ............ 370/335
2009/0219910 A1* 9/2009 Han et al. ...................... 370/343
2009/0225824 A1* 9/2009 Noh et al. ..................... 375/240

FOREIGN PATENT DOCUMENTS

| CN | 101035371 A | 9/2007 |
|---|---|---|
| CN | 101064529 A | 10/2007 |
| CN | 101325447 A | 12/2008 |
| JP | 2007221743 | 8/2007 |
| JP | 2008263576 | 10/2008 |
| JP | 2010506502 | 2/2010 |
| JP | 2010507315 | 3/2010 |
| JP | 2010508788 | 3/2010 |
| WO | WO2008042865 | 4/2008 |
| WO | WO2008048060 | 4/2008 |
| WO | WO2008057898 | 5/2008 |
| WO | WO 2008093621 A1 | 8/2008 |

OTHER PUBLICATIONS

Liao et al, A New Preamble Structure for Robust Timing/Frequency Synchronization in IEEE 802.16m System, Jul. 9, 2008, IEEE, 802 16, pp. 1-5.*

(Continued)

*Primary Examiner* — Anez Ebrahim
(74) *Attorney, Agent, or Firm* — Imperium Patent Works; Zheng Jin (57) ABSTRACT

A hierarchical downlink (DL) synchronization channel (SCH) is provided for wireless OFDM/OFDMA systems. The SCH includes a Primary SCH (P-SCH) for carrying PA-Preambles used for coarse timing and frequency synchronization, and a Secondary SCH (S-SCH) for carrying SA-Preambles used for cell ID detection. The total time length occupied by P-SCH and S-SCH is equal to one OFDM symbol time length of a data channel, and S-SCH is located in front of P-SCH in each DL frame. A perfect multi-period time-domain structure is created and maintained in P-SCH to increase preciseness of frame boundary estimation. With overlapping deployment of macrocells and femtocells, a pre-defined SCH configuration scheme is provided to separate frequency subbands used for macrocells and femtocells such that interferences in S-SCH can be mitigated. In addition, a self-organized SCH configuration scheme is provided to allow more flexibility for femtocells to avoid or introduce interference in S-SCH.

16 Claims, 8 Drawing Sheets

(56) References Cited

OTHER PUBLICATIONS

Japan Office Action of Japan paten application JP2011-542664 dated Nov. 6, 2012 (8 pages).

International Search Report and Written Opinion of International Search Authority for PCT/CN2010/076346 dated Apr. 1, 2010 (12 pages).

* cited by examiner (PRIOR ART)
FIG. 1

METHOD OF SCH CONFIGURATION FOR
FEMTOCELLS IN OFDM/OFDMA SYSTEMS

FIG. 7

| P - SCH / S - SCH | Segment 1 | Segment 2 | Segment 3 |
|---|---|---|---|
| First subband | Cell Type A | Cell Type B | Cell Type C |
| Second subband | Cell Type C | Cell Type A | Cell Type B |
| Third subband | Cell Type B | Cell Type C | Cell Type A |

SYNCHRONIZATION CHANNEL FOR ADVANCED WIRELESS OFDM/OFDMA SYSTEMS

CROSS REFERENCE TO RELATED APPLICATIONS

This application claims priority under 35 U.S.C. §119 from U.S. Provisional Application No. 61/141,843, entitled "A Novel Synchronization Channel Design for Advanced Wireless OFDM/OFDMA System," filed on Dec. 31, 2008; U.S. Provisional Application No. 61/154,789, entitled "Downlink Synchronization Channel Design for Advanced Wireless OFDM/OFDMA System," filed on Feb. 24, 2009; the subject matter of which is incorporated herein by reference.

TECHNICAL FIELD

The disclosed embodiments relate generally to wireless network communications, and, more particularly, to synchronization channel design in advanced wireless orthogonal frequency division multiplexing (OFDM) and/or orthogonal frequency division multiple access (OFDMA) communication systems.

BACKGROUND

In wireless communication systems, such as defined by IEEE 802.16e specification, base stations and mobile stations communicate with each other by sending and receiving data carried in a series of superframes. Before a mobile station can access a base station, physical (PHY) layer synchronization and Media Access Control (MAC) layer synchronization are performed. Upon power-on, a mobile station first acquires downlink (DL) synchronization and adjusts its timing, frequency and power via synchronization channel (SCH) broadcasted by a serving base station. After DL synchronization, the mobile station acquires uplink (UL) PHY layer synchronization via ranging procedures and MAC layer synchronization via network entry procedures with the serving base station.

A synchronization channel (SCH) is a radio resource region within each DL superframe allocated for preamble transmission from base stations to mobile stations. A preamble is a predefined code sequence used to facilitate DL network synchronization. A well-designed SCH structure is desirable to provide reliable reference signals in both time and frequency domain for DL network synchronization, to support channel estimation for data and superframe header (SFH) decoding, and to support DL channel quality indicator (CQI) measurement and DL receive signal strength indicator (RSSI) measurement.

Figure 1:
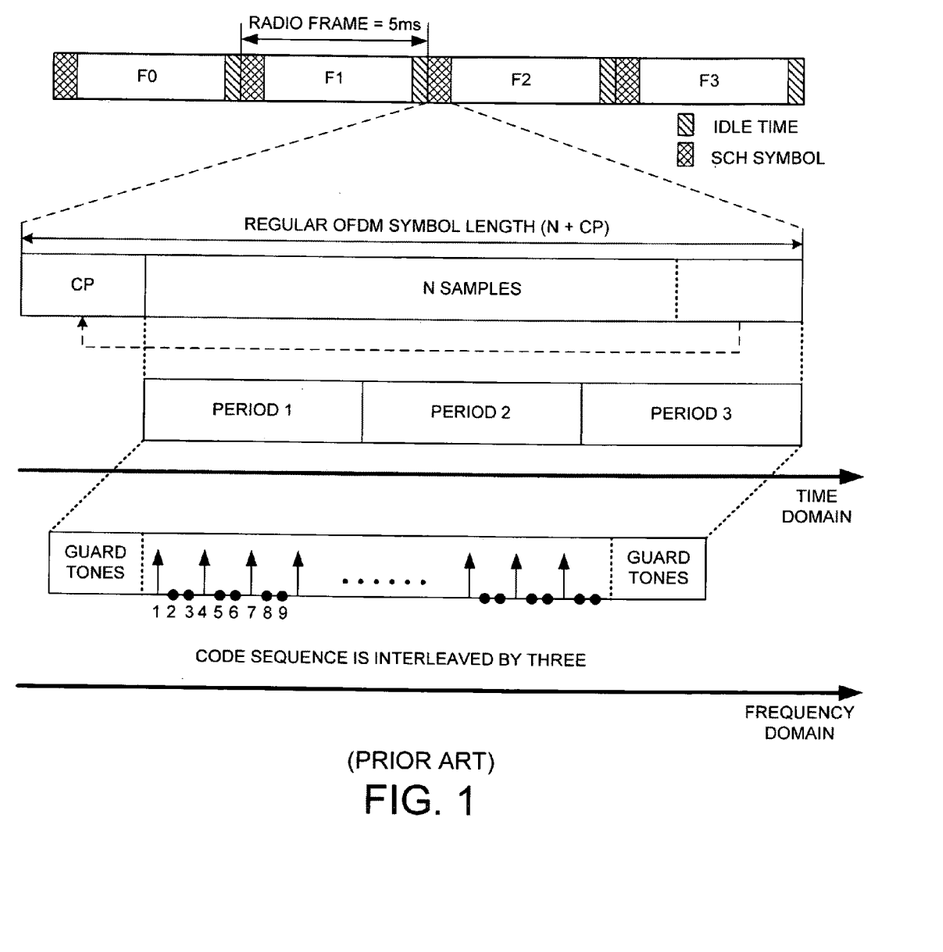
FIG. 1 (Prior Art) illustrates an SCH structure used in current IEEE 802.16e wireless OFDM and/or OFDMA systems.

FIG. 1 (Prior Art) illustrates an SCH structure used in current IEEE 802.16e wireless orthogonal frequency division multiplexing (OFDM) and/or orthogonal frequency division multiple access (OFDMA) systems. In the example of FIG. 1, a synchronization channel (SCH) is allocated in the first OFDM symbol in each DL radio frame to carry an SCH preamble to facilitate DL network synchronization. In a time domain representation of the SCH structure, an SCH symbol carries a cyclic prefix (CP) and N sample values (i.e., FFT=N) of the SCH preamble. The N sample values have a nearly three-period time-domain structure to better facilitate SCH preamble detection by the receiving mobile stations. Such three-period time-domain structure is created when frequency reuse three is applied for the SCH transmission. More specifically, as illustrated in FIG. 1, in a frequency domain representation of the SCH structure, the SCH preamble code sequence is interleaved by three when frequency reuse three is applied. For example, a first base station transmits an SCH preamble code sequence using subcarriers 1, 4, 7, . . . and so on so forth, a second base station transmits an SCH preamble code sequence using subcarriers 2, 5, 8, . . . and so on so forth, and a third base station transmits an SCH preamble code sequence using subcarriers 3, 6, 8, . . . and so on so forth.

The above-illustrated IEEE 802.16e SCH design, however, is associated with several problems. First, the three-period time-domain structure is not perfect and thus degrades the preciseness of frame boundary estimation by delay-correlation approach. Second, the three-period time-domain structure can be destroyed at cell edge and thus increase the difficulty of SCH preamble detection by delay-correlation approach. Third, the IEEE 802.16e SCH design supports only 144 cell IDs in an IEEE 802.16e system, which is not enough for future femtocell deployment. Finally, the IEEE802.16e SCH design has not taken into consideration the increasing interferences due to overlapping deployment of macrocells and femtocells. It thus remains a challenge to have a well-designed SCH structure to resolve the above issues.

SUMMARY

A hierarchical downlink (DL) synchronization channel (SCH) is provided for wireless OFDM/OFDMA systems. The SCH includes a Primary SCH (P-SCH) for carrying PA-Preambles used for coarse timing and frequency synchronization, and a Secondary SCH (S-SCH) for carrying SA-Preambles used for cell ID detection. The hierarchical DL synchronization scheme is able to support more Cell IDs as compared to the traditional SCH structure defined in the IEEE 802.16e specification. In one embodiment, the total time length occupied by P-SCH and S-SCH is equal to one OFDM symbol time length of a regular data channel.

P-SCH and S-SCH are further designed to achieve various advantageous aspects. First, S-SCH is located in front of P-SCH in time domain within each SCH symbol to allow time margin for Auto Gain Controller (AGC) convergence. Second, P-SCH and S-SCH are encoded separately. Each of the SCHs is actually a short OFDM symbol. Third, different frequency reuse rates can be applied to P-SCH and S-SCH to achieve various application purposes. In addition, a perfect multi-period time-domain structure is created in P-SCH to increase preciseness of frame boundary estimation. The time-domain structure remains unchanged in cell edge if frequency reuse one is applied in P-SCH.

With overlapping deployment of macrocells and femtocells in future wireless systems, a predefined SCH configuration scheme is provided to separate frequency subbands used for macrocells and femtocells such that interferences in S-SCH can be mitigated. In one embodiment, each macrocell belongs to a segment associated with a segment index and uses a corresponding frequency subband for SA-Preamble transmission. The frequency subband used for SA-Preamble transmission by a femtocell is based on a predefined mapping function. The predefined mapping function may depend on the segment index of the overlapping macrocell and/or the type of the femtocell. After obtaining the segment index of the macrocell, the femtocell can select a frequency subband for its own SA-Preamble transmission based on the predefined mapping function.

In addition, a self-organized SCH configuration scheme is provided to allow more flexibility for femtocells to mitigate interferences in S-SCH from or to other cells. In one embodiment, a femtocell first scans SCH preambles transmitted by other overlapping macrocells or femtocells. The femtocell then measures interferences from other cells for each of the frequency subbands. Based on the interference measurement results, the femtocell selects a frequency subband with the least amount of interference for its own SA-Preamble transmission.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 2:
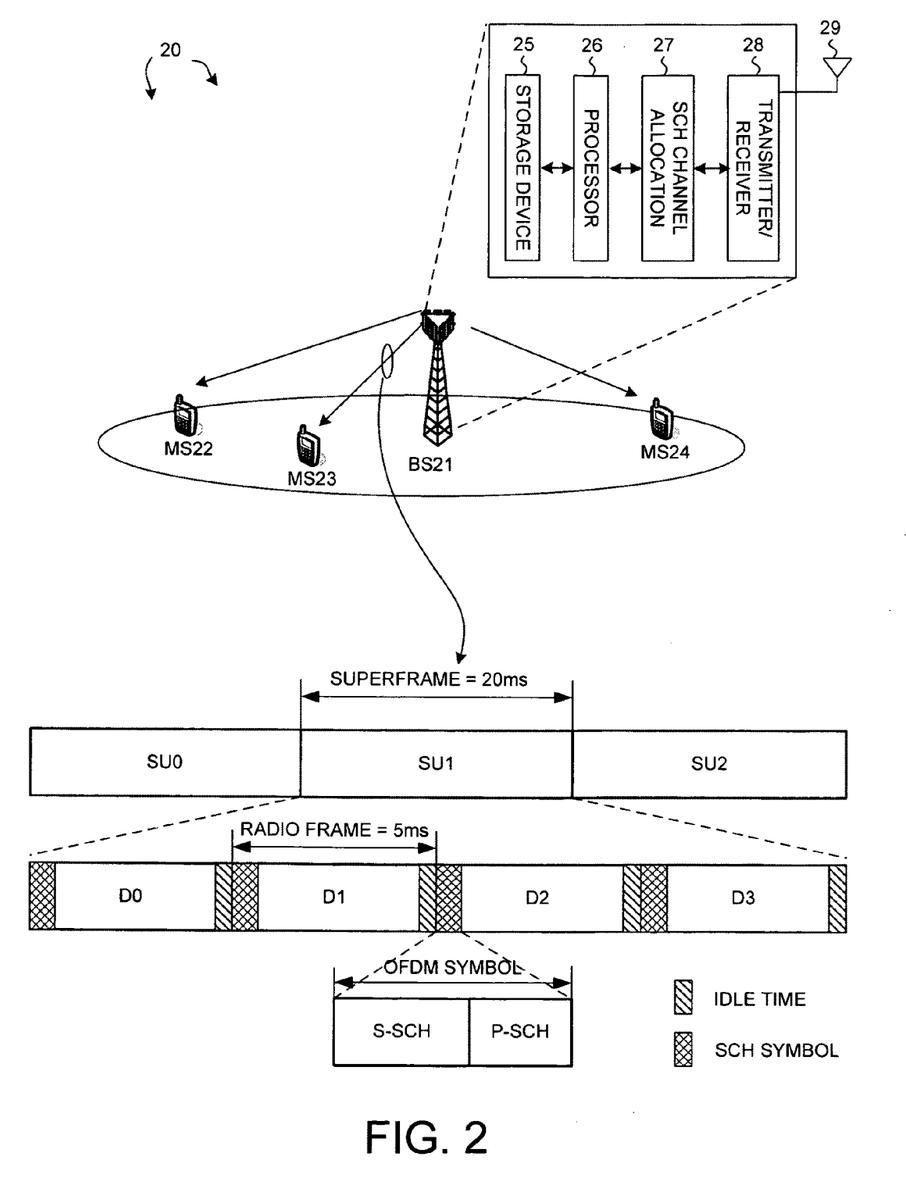
FIG. 2 illustrates a wireless OFDM/OFDMA system with hierarchical downlink synchronization in accordance with one novel aspect.

FIG. 2 illustrates a wireless orthogonal frequency division multiplexing (OFDM) and/or orthogonal frequency division multiple access (OFDMA) system 20 with hierarchical downlink (DL) synchronization in accordance with one novel aspect. Wireless OFDM/OFDMA system 20 comprises base station BS21 and mobile stations MS22, MS23 and MS24. Base station BS21 comprises a storage device 25, a processor 26, a synchronization channel (SCH) allocation module 27, a radio frequency (RF) transmitter and receiver 28, and an antenna 29 that is coupled to RF transmitter and receiver 28. Upon power-on, multiple mobile stations MS12, MS13 and MS14 receive radio signals broadcasted from base station BS21. Before the mobile stations can access BS21 and communicate data, downlink (DL) physical layer synchronization is first required. The mobile stations make timing, frequency, and power adjustments via synchronization channel (SCH) monitoring and tracking during DL synchronization.

In the example of wireless OFDM/OFDMA system 20, base station BS21 and mobile stations MS22, MS23, and MS24 communicate with each other by sending and receiving radio signals carried via radio resource blocks in superframe structure. Each DL superframe (e.g., SU0, SU1, or SU2) contains four DL radio frames (e.g., D0, D1, D2, and D3). In one example, each superframe has a time length of twenty mille seconds, and each radio frame has a time length of five mille seconds. A DL synchronization channel (SCH) is allocated within each DL superframe used for preamble transmission by BS21 to facilitate DL synchronization. In the example of FIG. 2, the DL SCH is allocated in the first OFDM symbol (i.e., the SCH symbol) in each DL radio frame. In general, the SCH symbols carry one or more predefined SCH preamble code sequences to be transmitted by BS21. Based on the received preamble code sequences, mobile stations MS22, MS23, and MS24 are able to obtain reliable reference signals in both time and frequency domain for DL synchronization. In addition, MS22, MS23, and MS24 are able to perform channel estimation for data or superframe header (SFH) decoding.

As illustrated in FIG. 2, a hierarchical two-stage synchronization scheme is used for DL synchronization. In a two-stage synchronization scheme, the SCH is partitioned into two parts: a primary SCH (P-SCH) and a secondary SCH (S-SCH). In a first synchronization stage, P-SCH carries primary advanced-preamble (PA-Preamble) used to provide coarse timing and frequency synchronization such as superframe, radio frame, and OFDM symbol synchronization. PA-Preamble also carries system information such as carrier type and carrier bandwidth. PA-Preamble is usually common among base stations in the same frequency spectrum. In a second synchronization stage, S-SCH carries secondary advanced-preamble (SA-Preamble) used to provide fine timing synchronization and cell ID detection. SA-Preambles are usually different among various base stations. Furthermore, cell ID information may also be divided into two parts. PA-Preamble carries the first part of cell ID information in addition to the system information while SA-Preamble carries the second part of cell ID information. Both PA-Preambles and SA-Preambles are time-domain multiplexed (TDM) within one superframe.

In one advantageous aspect, the hierarchical two-stage synchronization scheme is able to support more Cell IDs as compared to the traditional SCH structure defined in the IEEE 802.16e specification. When preamble code sequences are used to compensate integer frequency offset between a base station and a mobile station, good auto-correlation and cross-correlation among different code sequences are required. As a result, not too many code sequences are available because of the constraints imposed on the code sequences. Consequently, only 144 Cell IDs are supported in legacy IEEE 802.16e systems because SCH preambles are used for frequency synchronization as well as Cell ID detection. On the other hand, by separating SCH preambles into PA-Preambles and SA-Preambles, coarse timing and frequency synchronization is accomplished by PA-Preambles, while SA-Preambles are used only for fine timing synchronization and Cell ID detection. Because integer frequency offset is already compensated by P-SCH, it releases the constraint on code sequence design for S-SCH. Thus, more code sequences are available because good cross-correlation among different code sequences is no longer required. For example, code sequences generated by cyclic-shifting based on the same base sequence can be used as SA-Preambles. As a result, more Cell IDs can be supported for future advanced IEEE 802.16m systems (i.e., 768 Cell IDs) with femtocell deployment.

In addition to the above-described hierarchical two-stage synchronization scheme, P-SCH and S-SCH together occupies one OFDM symbol time length of a regular data channel in each DL radio frame. P-SCH and S-SCH are further designed to achieve various advantageous aspects. First, S-SCH is located in front of P-SCH in time domain within each SCH symbol to allow time margin for Auto Gain Controller (AGC) convergence. Upon power on, a mobile station seeks a reference signal to adjust its AGC. With properly adjusted AGC, less quantization levels and less power variation can be achieved. By allocating S-SCH in front of P-SCH, the SA-Preamble can be used as the reference signal for the mobile station to adjust its AGC. As a result, the mobile station has some time margin for AGC convergence before it receives the PA-Preamble. Second, P-SCH and S-SCH are encoded separately. Each of the SCHs is actually a short OFDM symbol. For example, if the data channel uses 1024 FFT size, then 512 FFT size is used for P-SCH and S-SCH. Third, different frequency reuse rates can be applied to P-SCH and S-SCH to achieve various application purposes. For example, frequency reuse one is applied for PA-Preamble transmission to exploit macro-diversity gain because the same PA-Preamble is shared among base stations. On the other hand, frequency reuse three (or any integer N that is larger than one) is applied for SA-Preamble transmission to mitigate inter-cell interference because SA-Preambles are different among base stations.

Figure 3:
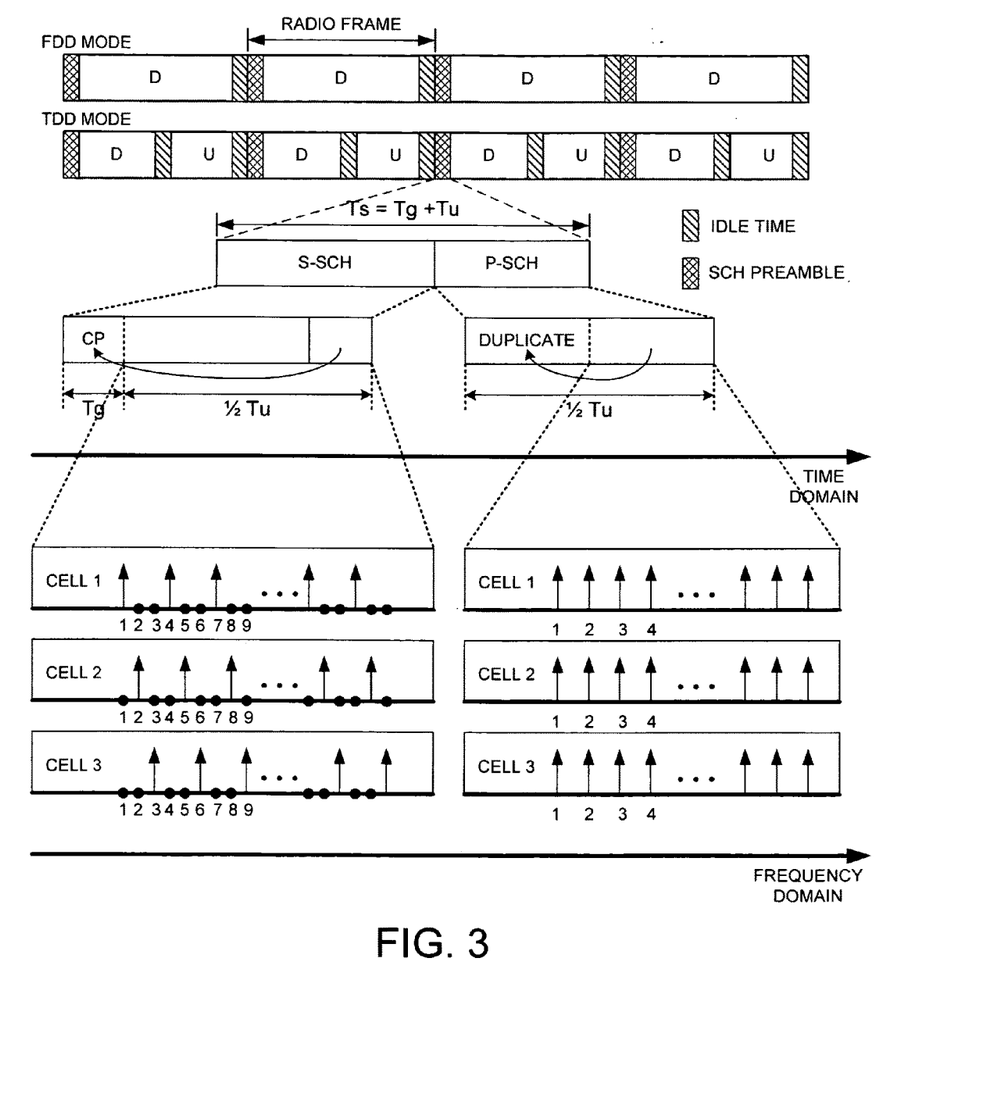
FIG. 3 illustrates a first embodiment of the novel two-stage SCH structure in an advanced system only mode.

FIG. 3 illustrates a first embodiment of the novel two-stage SCH structure in advanced system only mode. In advanced system only mode, only an advanced system such as an IEEE 802.16m system exists in the occupied channel bandwidth. As illustrated in FIG. 3, in a time-domain representation, each radio frame in Frequency-Division Duplexing (FDD) mode starts with an SCH symbol followed by a DL frame and ends with an idle time. On the other hand, each radio frame in Time-Division Duplexing (TDD) mode starts with an SCH symbol followed by a DL frame, and then an idle time followed by an UL frame, and finally ends with another idle time. In both FDD mode and TDD mode, each SCH symbol is the first OFDM symbol in each DL frame, in which S-SCH and P-SCH together occupies one OFDM symbol time length of a regular data channel. If Ts represents the time length of one regular OFDM symbol, and Tg represents the time length of guard interval, then Ts=Tg+Tu, where Tu is the time length of one useful OFDM symbol. In addition, the time length of S-SCH is half of Tu plus the guard interval Tg, and the time length of P-SCH is the remaining half of Tu.

As illustrated in FIG. 3, in a frequency-domain representation, different frequency reuse rates are applied to P-SCH and S-SCH. For SA-Preamble transmission, S-SCH is applied with frequency reuse three to mitigate inter-cell interference because SA-Preamble code sequences are used to carry cell ID information and thus are different among different base stations. Under frequency reuse three, neighboring base stations use different non-overlapping frequency subcarriers for SA-Preamble transmission. For example, cell 1 transmits an SA-preamble code sequence using subcarriers 1, 4, 7, . . . and so on so forth, cell 2 transmits an SA-preamble code sequence using subcarriers 2, 5, 8, . . . and so on so forth, and cell 3 transmits an SA-preamble code sequence using subcarriers 3, 6, 9, . . . and so on so forth.

On the other hand, for PA-Preamble transmission, P-SCH is applied with frequency reuse one because PA-Preamble is used for coarse timing and frequency synchronization and thus can be shared among base stations. Because periodic time-domain structures can enable easier preamble code sequences detection, a two-period time-domain structure is thus desirable. Other multi-period time-domain structure can also be applied but the number of periods has to be the factor number of FFT size so that a perfect multi-period time-domain structure can be created. If the number of periods is not the factor number of FFT size, perfect multi-period time-domain structure cannot be formed and oversampling may be needed to improve the preciseness of frame boundary estimation at mobile station. In the example of FIG. 3, a two-period time-domain structure of the P-SCH is created by using half of the OFDM symbol length allocated for P-SCH. For example, if 1024 FFT size is used for regular data channel, then 512 FFT size is used for P-SCH and S-SCH such that the total time length occupied by P-SCH and S-SCH is equal to one OFDM symbol time length of the regular data channel. For P-SCH, however, 256 (i.e., half of 512) FFT size is used to form the first portion of time domain samples, which is then duplicated to form the second portion, such that a perfect two-period time-domain structure is created for PA-Preamble. The perfect two-period time-domain structure increases preciseness of frame boundary estimation by delay-correlation approach without the need of oversampling by the mobile station. In addition, the two-period time-domain structure remains unchanged at cell edge because frequency reuse one is applied for P-SCH (i.e., each cell uses all the subcarriers allocated for P-SCH for PA-Preamble transmission).

Figure 4:
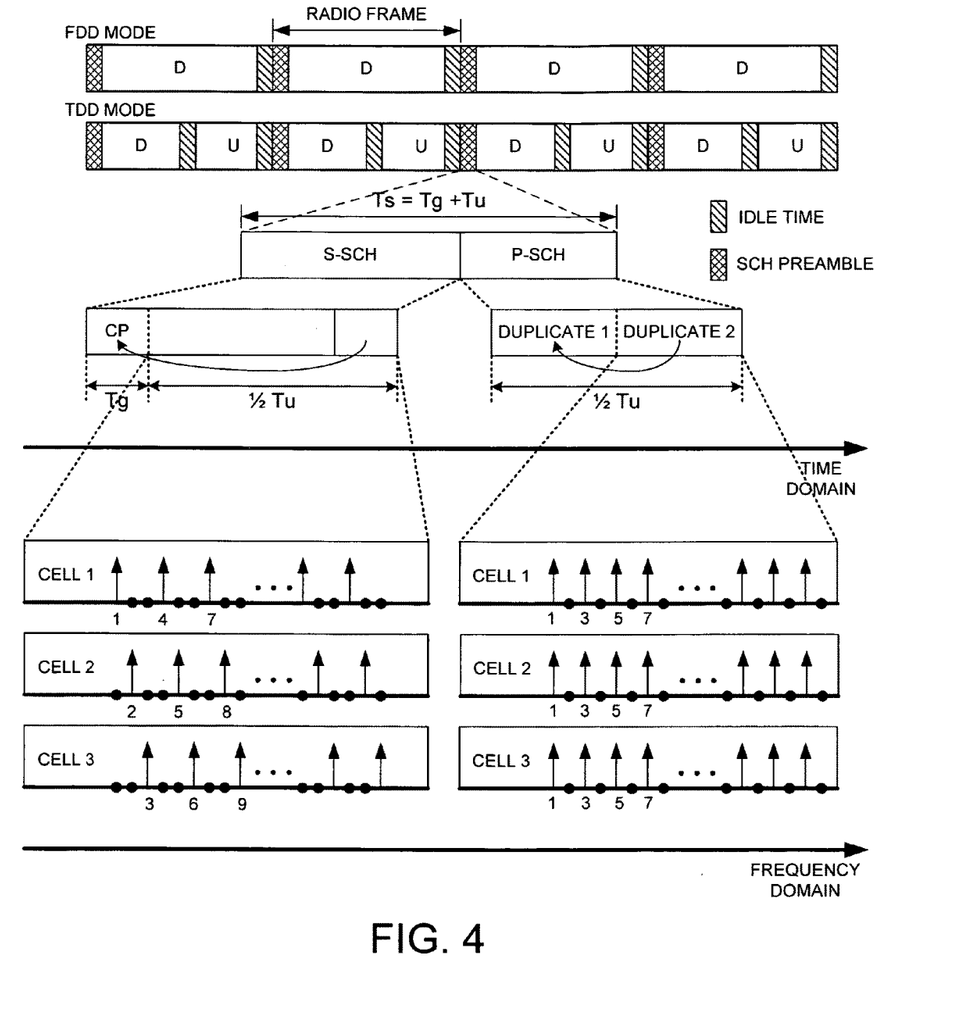
FIG. 4 illustrates a second embodiment of the novel two-stage SCH structure in an advanced system only mode.

FIG. 4 illustrates a second embodiment of the novel two-stage SCH structure in an advanced system only mode. FIG. 4 is similar to FIG. 3, except for the method of creating a two-period time-domain structure for PA-Preamble transmission. In the example of FIG. 4, the same 512 FFT size is used for P-SCH as used for S-SCH. However, each cell uses only half of the allocated frequency subcarriers for PA-Preamble transmission. For example, cell 1 uses subcarriers 1, 3, 5 . . . and so on so forth to transmit its PA-Preamble, while cell 2 and cell 3 also use subcarriers 1, 3, 5 . . . and so on so forth to transmit their PA-Preamble. By interleaving subcarriers to transmit preamble code sequences, the same two-period time-domain structure as in FIG. 3 is created.

Figure 5:
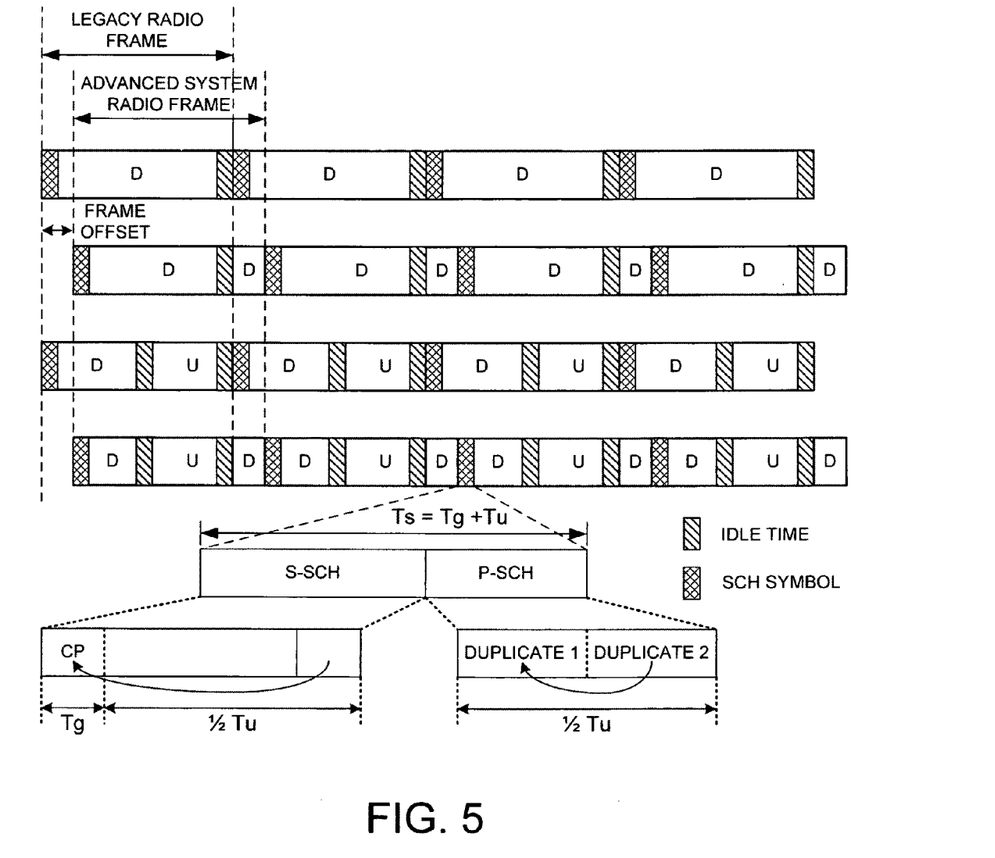
FIG. 5 illustrates an embodiment of the novel two-stage SCH structure in a legacy system support mode.

FIG. 5 illustrates an embodiment of the novel two-stage SCH structure in legacy system support mode. In legacy system support mode, a legacy IEEE 802.16e system and an advanced IEEE 802.16m system share the occupied channel bandwidth. To avoid time-domain collision between SCH allocated in legacy radio frames and SCH allocated in advanced radio frames, the legacy radio frames and the advanced radio frames have a frame offset in time domain. As illustrated in FIG. 5, the SCHs in both systems are separated by the frame offset, while the idle times in both systems are still well aligned.

While the above-illustrated hierarchical DL synchronization scheme is able to support more Cell IDs for future femtocell deployment, the problem of increasing interferences due to the overlapping deployment of macrocells and femtocells remains unsolved. Femtocells are developed to enhance indoor coverage by reusing the licensed spectrum as part of wireless network infrastructure. By reusing the same air interface and operating at the same licensed spectrum as macrocells, network operators benefit from reduced development cost on macrocells for indoor coverage and increased revenue from indoor wireless communication. The overlapping deployment of macrocells and femtocells, however, introduces increasing interferences when the coverage of macrocells overlaps with the coverage of femtocells. It is thus desirable to have well-designed SCH for macrocells and femtocells to reduce interference and to provide quality service in wireless OFDM/OFDMA systems.

Figure 6:
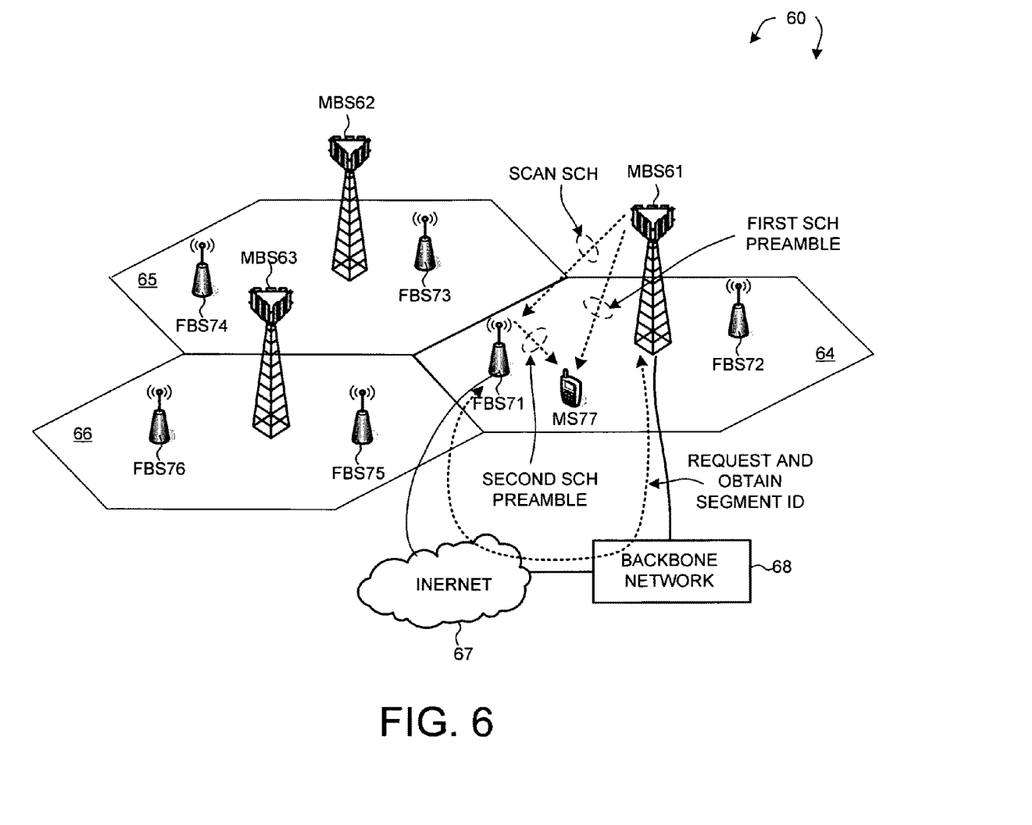
FIG. 6 illustrates a wireless OFDM/OFDMA system with overlapping femtocells and macrocells in accordance with one novel aspect.

FIG. 6 illustrates a wireless OFDM/OFDMA system 60 with overlapping femtocells and macrocells in accordance with one novel aspect. Wireless OFDM/OFDMA system 60 comprises a plurality of macro base stations MBS61, MBS62, and MBS63 serving a plurality of cells 64, 65, and 66 respectively. The macrocells are connected to a backbone cellular network 68 via dedicated connections (i.e., shown for MBS61 but not shown for other macrocells). Wireless OFDM/

OFDMA system 60 also comprises a plurality of femto base stations FBS71-76. The femtocells are connected to the backbone cellular network 68 through internet 67 via broadband connections (i.e., shown for FBS71 but not shown for other femtocells). As illustrated in FIG. 6, the femtocells FBS71-76 are located within the cell coverage of the macro base stations.

For DL synchronization, both macro base stations and femto base stations broadcast SCH preambles via allocated DL SCHs. Because of the overlapping cell coverage, SCH preambles broadcasted by the macro base stations and femto base stations will interfere with each other. For example, a mobile station MS77 located within the coverage of both MBS61 and FBS71 receives a first SCH preamble transmitted from MBS61 and a second SCH preamble transmitted from FBS71. Moreover, if both SCH preambles from MBS61 and FBS71 are transmitted using the same frequency subband (i.e., with overlapping frequency subcarriers), then MS77 will only be able to receive and detect the SCH preamble transmitted with stronger power. In one novel aspect, the SCH of a femto base station is configured in such a way that the SCH preamble transmitted by the femto base station and another SCH preamble transmitted by an overlapping macro base station do over interfere with each other (or have minimum interference against each other). Two different SCH configuration schemes for femtocells are now described below with more details.

Figure 7:
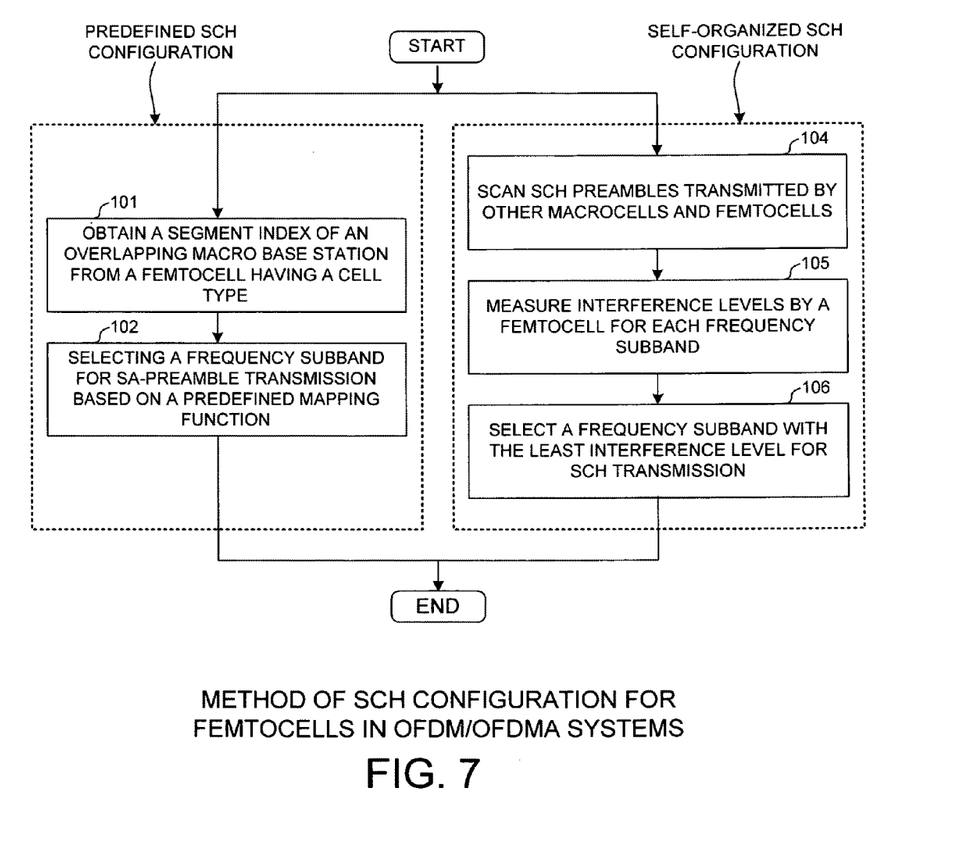
FIG. 7 is a flow chart of methods of SCH configuration for femtocells in a wireless OFDM/OFDMA system of FIG. 6.

FIG. 7 is a flow chart of methods of different SCH configuration schemes for femtocells in wireless OFDM/OFDMA system 60 of FIG. 6. In wireless OFDM/OFDMA system 60, macrocell MBS61 uses a hierarchical two-stage synchronization scheme for DL synchronization. For PA-Preamble transmission, MBS61 applies frequency reuse one for its primary SCH (P-SCH). Both femtocell and its overlaying macrocell base stations transmit the same PA-Preamble code sequence over the primary SCH so that there is no serious interference between femtocells and the overlaying macrocell in primary SCH. For SA-Preamble transmission, MBS61 applies frequency reuse three for its secondary SCH (S-SCH). Under frequency reuse three, the total occupied channel bandwidth is partitioned into three frequency subbands, and each frequency subband contains a plurality of non-overlapping contiguous or distributed physical frequency subcarriers. In addition, each base station belongs to a segment associated with a specific segment index and uses a corresponding frequency subband for its SA-Preamble transmission.

In a first predefined SCH configuration scheme, the frequency subband used for SA-Preamble transmission is based on a predefined mapping function. First, femtocell base station FBS71 obtains the segment index of its overlapping macrocell base station MBS61 (step 101). In one example, MBS61 transmits its segment index to FBS71 through backbone network 68 upon receiving a request from FBS71. In another example, FBS71 actively scans SA-Preambles transmitted by MBS61 and then obtains the segment index of MBS61 based on the frequency subband used by MBS61 for its SA-Preamble transmission. In yet another example, the segment index of MBS61 can also be obtained by scanning PA-Preamble transmitted by MBS61 if primary SCH is configured to carry the segment information. After obtaining the segment index of macrocell MBS61, femtocell FBS71 then selects a frequency subband for its own SA-Preamble transmission based on a predefined mapping function (step 102).

Figure 8:
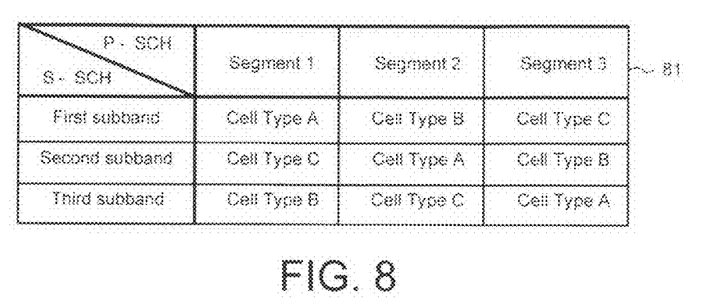
FIG. 8 illustrates one embodiment of a predefined mapping function used in a predefined SCH configuration scheme.

FIG. 8 illustrates one embodiment of a predefined mapping function used in a predefined SCH configuration scheme. In the example of FIG. 8, the predefined mapping function is based on the combination of segment index and cell type of each base station as defined in table 81. Under table 81, each base station belongs to one segment associated with a segment index. In addition, each base station has a particular cell type. For example, different cell types such as macrocell, Open Subscriber Group (OSG) femtocell, Close Subscriber Group (CSG) Close femtocell, CSG Open femtocell, and hot-zone picocell have all been defined in the current IEEE 802.16 specification. In the example of table 81, three segment indexes 1-3 and three cell types A-C are listed. For P-SCH, each base station applies frequency reuse one. For S-SCH, each base station applies frequency reuse three and uses one of the three frequency subbands based on its segment index and its cell type as defined by table 81.

Figure 9:
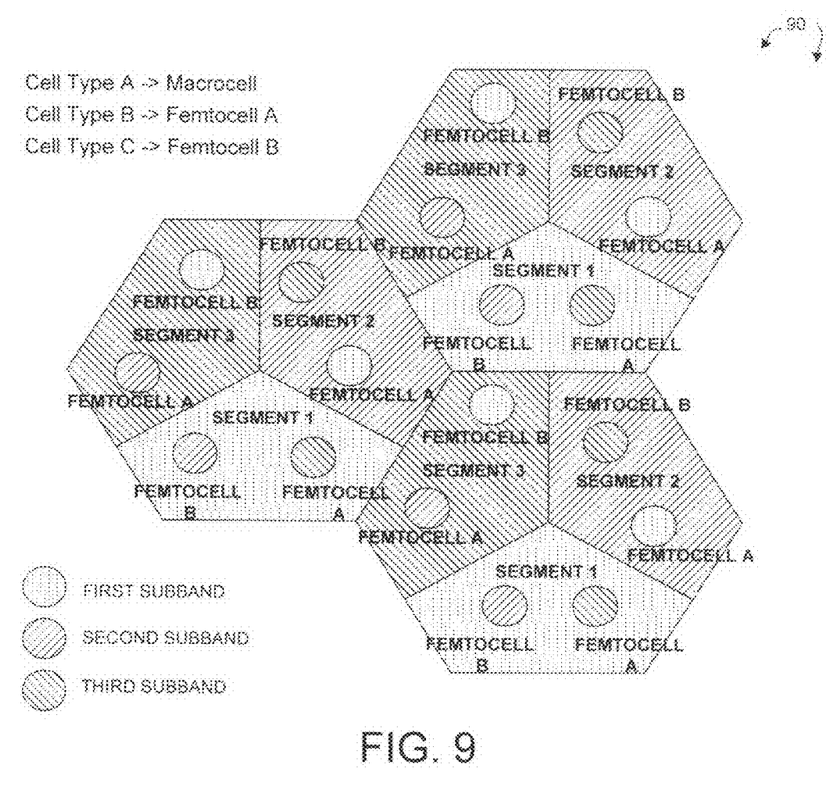
FIG. 9 illustrates an example of a predefined SCH configuration in a wireless OFDM/OFDMA system using the predefined mapping function of FIG. 8.

FIG. 9 illustrates an example of an SCH configuration in a wireless OFDM/OFDMA system 90 using the predefined mapping function of FIG. 8. In wireless OFDM/OFDMA system 90, Cell Type A represents macrocell, Cell Type B represents femtocell A, and Cell Type C represents femtocell B. As illustrated in FIG. 9, each macrocell in every three neighboring macrocells belongs to one of the three segments and uses one of the three frequency subbands for SA-Preamble transmission. Under the predefined SCH configuration scheme, after obtaining the segment index of its overlapping macrocell, each femtocell simply selects a frequency subband for its own SA-Preamble transmission based on the obtained segment index and its own cell type as defined in Table 81. Thus, by applying different frequency reuse patterns to various overlapping cells, and by using predefined mapping rules based on segment indexes and cell types, the frequency subbands used for macrocells and femtocells are separated to mitigate interferences in S-SCH.

Referring back to FIG. 7, in a second self-organized SCH configuration scheme, femtocell FBS71 first scans SCH preambles transmitted by other overlapping macrocells or femtocells (step 104). FBS71 then measures interferences from other cells for each of the frequency subbands (step 105). In one example, FBS71 conducts receive signal strength indicator (RSSI) measurement over each frequency subband. One simple interference measurement method is to estimate the power over each frequency subband such as adding the squared value of each subcarrier in each frequency subband. Based on the measurement results, FBS71 selects a frequency subband with the least amount of interference for its own SA-Preamble code sequence transmission (step 106). By conducting RSSI measurement, the self-organized SCH configuration scheme allows more flexibility for femtocells to avoid interference from other cells, and to avoid introducing interference to other cells.

Although the present invention has been described in connection with certain specific embodiments for instructional purposes, the present invention is not limited thereto. For example, although frequency reuse three is applied for SA-Preamble transmission, other frequency reuse rates may be applied. Although a two-period time-domain structure is created for P-SCH, other multi-period time-domain structure may be created. In addition, the illustrated SCH configuration may be used in picocells as well as in femtocells and the described scenarios in this invention can be directly applied to microcell as well as macrocell. Accordingly, various modifications, adaptations, and combinations of various features of the described embodiments can be practiced without departing from the scope of the invention as set forth in the claims.

What is claimed is:

1. A method for providing a synchronization channel (SCH), the method comprising:

allocating the SCH in a downlink (DL) frame by a base station, wherein the SCH comprises a Primary SCH (P-SCH) and a Secondary SCH (S-SCH), wherein the total time length occupied by the P-SCH and the S-SCH is equal to one OFDM symbol time length of a data channel, and wherein the S-SCH is located in front of the P-SCH in the DL frame, wherein the P-SCH is applied with frequency reuse one to maintain a multi-period time-domain structure in cell edge, and wherein the S-SCH is applied with frequency reuse N to mitigate interference among different cells, and wherein N is an integer larger than one; and transmitting SCH preambles via the synchronization channel (SCH) in a wireless OFDM/OFDMA system.

2. The method of claim 1, wherein the P-SCH provides coarse timing and frequency synchronization and carries system information, and wherein the P-SCH optionally carries a first part of Cell ID information.

3. The method of claim 2, wherein the system information further comprises channel bandwidth, carrier type, and segment information.

4. The method of claim 1, wherein the S-SCH provides fine timing synchronization and carries a second part of Cell ID information.

5. The method of claim 1, wherein the P-SCH contains a preamble sequence that is common among different base stations in the same frequency spectrum, and wherein the S-SCH contains a preamble sequence that is unique among different base stations.

6. The method of claim 1, wherein the P-SCH occupies half of useful OFDM symbol time length (Tu) of the data channel, and wherein the S-SCH occupies half of useful OFDM symbol time length (Tu) of the data channel plus one cyclic prefix time length (Tg).

7. The method of claim 1, wherein the P-SCH has multi-period time-domain structure that is different from a synchronization channel of a coexisting legacy system sharing the same frequency band.

8. The method of claim 1, wherein the base station is compatible with IEEE 802.16m specification, wherein a second base station compatible with IEEE 802.16e specification transmits a second synchronization channel (SCH) in the OFDM/OFDMA system, and wherein the SCH and the second SCH are separated in time domain by a time length of a frame offset.

9. A base station, comprising:

a synchronization channel (SCH) allocation module that allocates an SCH in a downlink (DL) frame, wherein the SCH comprises a Primary SCH (P-SCH) and a Secondary SCH (S-SCH), wherein the total time length occupied by the P-SCH and the S-SCH is equal to one OFDM symbol time length of a data channel, and wherein the S-SCH is located in front of the P-SCH in the DL frame, wherein the P-SCH is applied with frequency reuse one to maintain a multi-period time-domain structure in cell edge, and wherein the S-SCH is applied with frequency reuse N to mitigate interference among different cells, and wherein N is an integer larger than one; and a radio frequency (RF) transmitter that transmits SCH preambles via the synchronization channel (SCH) in a wireless OFDM/OFDMA system.

10. The base station of claim 9, wherein the P-SCH provides coarse timing and frequency synchronization and carries system information, and wherein the P-SCH optionally carries a first part of Cell ID information.

11. The base station of claim 10, wherein the system information further comprises channel bandwidth, carrier type, and segment information.

12. The base station of claim 9, wherein the S-SCH provides fine timing synchronization and carries a second part of Cell ID information.

13. The base station of claim 9, wherein the P-SCH contains a preamble sequence that is common among different base stations in the same frequency spectrum, and wherein the S-SCH contains a preamble sequence that is unique among different base stations.

14. The base station of claim 9, wherein the P-SCH occupies half of useful OFDM symbol time length (Tu) of the data channel, and wherein the S-SCH occupies half of useful OFDM symbol time length (Tu) of the data channel plus one cyclic prefix time length (Tg).

15. The base station of claim 9, wherein the P-SCH has multi-period time-domain structure that is different from a synchronization channel of a coexisting legacy system sharing the same frequency band.

16. The base station of claim 9, wherein the base station is compatible with IEEE 802.16m specification, wherein a second base station compatible with IEEE 802.16e specification transmits a second synchronization channel (SCH) in the OFDM/OFDMA system, and wherein the SCH and the second SCH are separated in time domain by a time length of a frame offset.

* * * * *